(12) United States Patent
Tamura

(10) Patent No.: US 8,305,344 B2
(45) Date of Patent: *Nov. 6, 2012

(54) PROJECTOR AND PROJECTOR ACCESSORY

(75) Inventor: Youichi Tamura, Tokyo (JP)

(73) Assignee: NEC Display Solutions of America, Inc., Tokyo (JP)

( * ) Notice: Subject to any disclaimer, the term of this patent is extended or adjusted under 35 U.S.C. 154(b) by 1014 days.

This patent is subject to a terminal disclaimer.

(21) Appl. No.: 11/625,631

(22) Filed: Jan. 22, 2007

(65) Prior Publication Data

US 2007/0188475 A1    Aug. 16, 2007

Related U.S. Application Data

(63) Continuation of application No. 10/960,118, filed on Oct. 8, 2004, now Pat. No. 7,185,987.

(30) Foreign Application Priority Data

Oct. 10, 2003  (JP) ................................. 2003-352921

(51) Int. Cl.
G06F 3/033 (2006.01)
G06F 3/043 (2006.01)
G09G 5/08 (2006.01)
G09G 5/00 (2006.01)

(52) U.S. Cl. ........ 345/158; 345/156; 345/157; 345/177; 345/179

(58) Field of Classification Search ........... 345/156–184
See application file for complete search history.

(56) References Cited

U.S. PATENT DOCUMENTS

| | | | |
|---|---|---|---|
| 5,483,299 A * | 1/1996 | Minoura | 348/745 |
| 6,437,314 B1 | 8/2002 | Usuda et al. | |
| 6,575,581 B2 | 6/2003 | Tsurushima | |
| 6,598,979 B2 | 7/2003 | Yoneno | |
| 6,707,444 B1 * | 3/2004 | Hendriks et al. | 345/156 |
| 6,798,403 B2 | 9/2004 | Kitada et al. | |
| 6,962,416 B2 * | 11/2005 | Ohara | 353/70 |
| 7,185,987 B2 * | 3/2007 | Tamura | 353/42 |
| 2002/0101412 A1 | 8/2002 | Tasaki | |
| 2004/0075820 A1 | 4/2004 | Chu et al. | |
| 2004/0239653 A1 | 12/2004 | Stuerzlinger | |
| 2005/0083301 A1 | 4/2005 | Tamura | |
| 2005/0270494 A1 | 12/2005 | Banning | |

(Continued)

FOREIGN PATENT DOCUMENTS

JP    3-210622 A    9/1991

(Continued)

*Primary Examiner* — Bipin Shalwala
*Assistant Examiner* — Ilana Spar
(74) *Attorney, Agent, or Firm* — Sughrue Mion, PLLC

(57) ABSTRACT

A projector for enlarging and projecting the display image on a light valve onto a screen is provided with: an infrared photodetector for photodetecting infrared light that is emitted by an electronic pen that is manipulated on the screen and that is provided with an infrared light emission device and ultrasonic generator; at least two ultrasonic receivers for detecting ultrasonic waves that are emitted by the electronic pen; means for measuring the distance to a screen; and means for supplying coordinate data in which the position of the electronic pen on the screen, which has been calculated based on output of the infrared photodetector, output of the ultrasonic generator, and output of the means for measuring the distance to the screen, has been normalized by the length of a side of a projected rectangular image that has been enlarged and projected.

19 Claims, 4 Drawing Sheets

U.S. PATENT DOCUMENTS

2006/0183994 A1  8/2006  Murayama et al.
2006/0195274 A1  8/2006  Suzuki et al.

FOREIGN PATENT DOCUMENTS

| | | |
|---|---|---|
| JP | 7-230354 A | 8/1995 |
| JP | 2000-222127 A | 8/2000 |
| JP | 2002-207566 A | 7/2002 |
| JP | 2002-297119 A | 10/2002 |
| JP | 2002-331796 A | 11/2002 |
| JP | 2002-333314 A | 11/2002 |
| JP | 2002-351605 A | 12/2002 |
| WO | WO 00/21025 A1 | 4/2000 |

* cited by examiner

PROJECTOR AND PROJECTOR ACCESSORY

BACKGROUND OF THE INVENTION

1. Field of the Invention

The present invention relates to a projector that has an electronic blackboard function and to a projector accessory that adds an electronic blackboard function to a projector.

2. Description of the Related Art

In recent years, coordinate input devices have been developed that combine a signal processor having two ultrasonic receivers and one infrared light photodetector with an electronic pen having an infrared light emitting device and an ultrasonic generator. Such devices are a form of electronic blackboard capability in which a signal processor is installed in, for example, a white board, the position of an electronic pen is obtained by measuring the distance from the electronic pen to two ultrasonic receivers, and this position then taken into a personal computer as coordinates.

Regarding the construction, a signal processor is installed in the corner of a white board, the image of a personal computer is projected by a projector onto the white board, and the position of the projected image is read into the signal processor by using an electronic pen to designate specific positions of the projected image (for example, the four corners of the board). The coordinates of the electronic pen on the board are subsequently calculated by comparing the position of the electronic pen and the previously memorized specific positions. These calculated coordinates are transferred to the personal computer, whereby figures that are drawn on the board or the movement of a mouse cursor are processed (For example, refer to Japanese Patent Laid-Open Publication No. 2002-331796 (pp. 3-5, FIG. 3)).

FIG. 1A and FIG. 1B shows a typical example of the prior art, which is next described.

As shown in FIG. 1A, signal processor 102 that is installed on screen 100 is provided with infrared photodetector 120, ultrasonic receiver 121, and ultrasonic receiver 122. Infrared light pulse 104 and ultrasonic pulse 105 ("pulse" is here used to indicate a signal that is emitted for only an instant) are simultaneously emitted from electronic pen 103. Using the same principle by which the distance of lightning can be calculated from the difference between the time the lightning is seen and the time it is heard, signal processor 102 is able to find the distance from electronic pen 103 to each of ultrasonic receivers 121 and 122 by measuring the time interval from the input of infrared light pulse 104 to infrared photodetector 120 to the input of ultrasonic waves to ultrasonic receivers 121 and 122. Ultrasonic receivers 121 and 122 are fixed to signal processor 102, and the position of electronic pen 103 as seen from ultrasonic receivers 121 and 122 can be found based on the principle of triangulation (the position of a specific point can be calculated if the distance from the specific point to two different known points is known).

As shown in FIG. 1B, an image is projected onto a whiteboard by a projector; and projected image upper left 161, projected image upper right 162, projected image lower left 163, and projected image lower right 164 are designated by electronic pen 103 to store the position of projected image 106 in signal processor 102 (initialization of coordinates). When electronic pen 103 is subsequently used within projected image 106, the position of electronic pen 103 within the image can be calculated by comparing electronic pen 103 with the position of projected image, whereby the mouse cursor of the personal computer can be moved and icons on the screen can be designated. This concludes the construction of the prior art example.

In the above-described prior-art example, however, coordinates on a planar surface can be acquired only on a whiteboard in which a signal processor has been installed, and cannot be acquired on a whiteboard that lacks a signal processor. An additional problem is the necessity for initialization of coordinates by, for example, designating the four corner of an image.

SUMMARY OF THE INVENTION

The present invention was realized in view of these problems and has as its object the provision of a projector having an electronic blackboard function and a projector accessory that adds an electronic blackboard function to a projector, this projector and projector accessory being able to provide a solution to the above-described two problems by providing a projector with a signal processor or by providing a projector with a means for acquiring the distance from a projector to a screen.

To solve the above-described problems, the projector of the present invention includes: an infrared photodetector for detecting infrared light that is emitted by an electronic pen that is manipulated on a screen and that is provided with an infrared light emission device and an ultrasonic generator; and at least two ultrasonic receivers that detect ultrasonic waves that are emitted by the electronic pen; the projector being provided with the capability of acquiring the position of the electronic pen on the screen.

Another projector of the present invention is provided with: an infrared photodetector for detecting infrared light that is emitted by an electronic pen that is manipulated on a screen and that is provided with an infrared light emission device and an ultrasonic generator; at least two ultrasonic receivers that detect ultrasonic waves that are generated by the electronic pen; and a means for measuring the distance to the screen.

In addition, the above-described projector may further be provided with a means for acquiring the position of the electronic pen on the screen from the output of the infrared photodetector, the output of the ultrasonic receivers, and the output of the means for measuring the distance to the screen.

In addition, the above-described projector may be further provided with calibration means for: estimating the projector screen distance by using the electronic pen to indicate calibration points that are displayed by the projector; based on the projector-screen distance, correcting the vertical component of Cartesian coordinates derived by converting the distance to the pen tip; performing this correction for each calibration point; and storing the generated coordinates as corrected coordinates.

Another projector of the present invention is a projector that enlarges and projects a display image on a light valve onto a screen, this projector being provided with: an infrared photodetector for detecting infrared light that is emitted by an electronic pen that is manipulated on a screen and that is equipped with an infrared light emission device and an ultrasonic generator; at least two ultrasonic receivers for detecting ultrasonic waves that are emitted by the electronic pen; means for measuring the distance to the screen; means for supplying coordinate data in which the position of the electronic pen on the screen that is calculated based on output of the infrared photodetector, output of the ultrasonic receivers, and output of the means for measuring the distance to the screen has been normalized by the length of a side of a projected rectangular image that has been enlarged and projected; and means for performing calibration by: estimating the projector screen distance by using the electronic pen to indicate calibration points that are displayed by the projector, based on the projector-screen distance, correcting the vertical component of Cartesian coordinates derived by converting the distance to the pen tip, performing correction for each of the calibration points, and storing the generated coordinates as corrected coordinates; and in actual drawing, generating Cartesian coordinates based on the distance to the pen tip, using the projector-screen distance that was obtained during calibration to correct the vertical component, and using the corrected coordinates that were obtained during calibration to convert Cartesian coordinates after correction to a panel coordinate system.

The above-described projector may be a mirror-projection projector.

The projector accessory of the present invention includes: an infrared photodetector for detecting infrared light that is emitted by an electronic pen that is manipulated on a screen and that is provided with an infrared light emission device and an ultrasonic generator; and at least two ultrasonic receivers for detecting ultrasonic waves that are emitted by the electronic pen; and adds to the projector the capability to acquire the position of the electronic pen on the screen.

Another projector accessory of the present invention is provided with an infrared photodetector for detecting infrared light that is emitted by an electronic pen that is manipulated on a screen and that is provided with an infrared light emission device and an ultrasonic generator; at least two ultrasonic receivers for detecting ultrasonic waves that are generated by the electronic pen; and means for measuring the distance to the screen.

The above-described projector accessory may be further provided with a means for acquiring the position of the electronic pen on the screen based on the output of the infrared photodetector, the outputs of the ultrasonic receivers, and the output of the means for measuring the distance to the screen.

The above-described projector accessory may be further provided with calibration means for: estimating the projector screen distance by using the electronic pen to indicate calibration points that are displayed by the projector; based on the projector-screen distance, correcting the vertical component of Cartesian coordinates derived by converting the distance to the pen tip; performing this correction at each calibration point; and storing the generated coordinates as corrected coordinates.

The above-described projector may be a mirror-projection projector.

According to the present invention, a projector having an electronic blackboard function and a projector accessory for endowing a projector with an electronic blackboard function are realized by providing a projector with a signal processor or by providing a projector with means for acquiring the distance from the projector to a screen, thereby allowing a solution to the two problems in the prior-art example, these problems being the inability to obtain coordinates on any planar surface other than a whiteboard in which a signal processor was installed, and thus, the inability to acquire coordinates on a whiteboard that lacked a signal processor; and in addition, the necessity for coordinate initialization by designating the four corners of a screen.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1A:
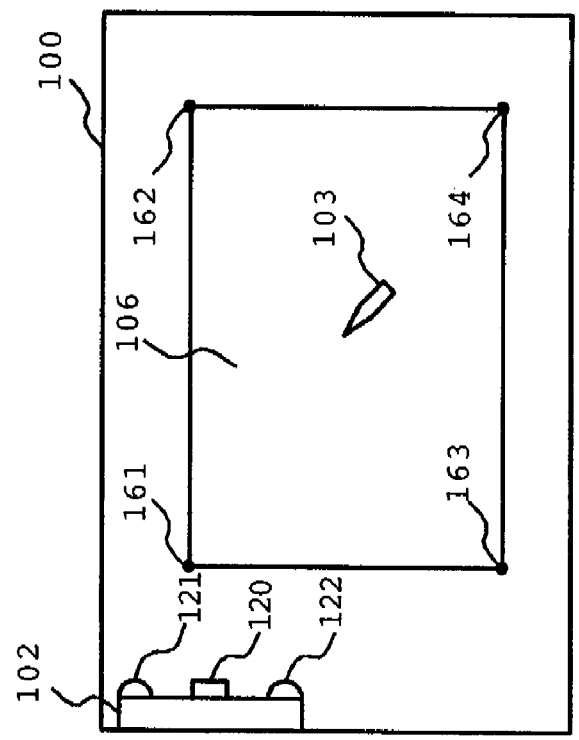
FIGS. 1A and 1B are views for explaining an electronic blackboard of the prior art.
Figure 1B:
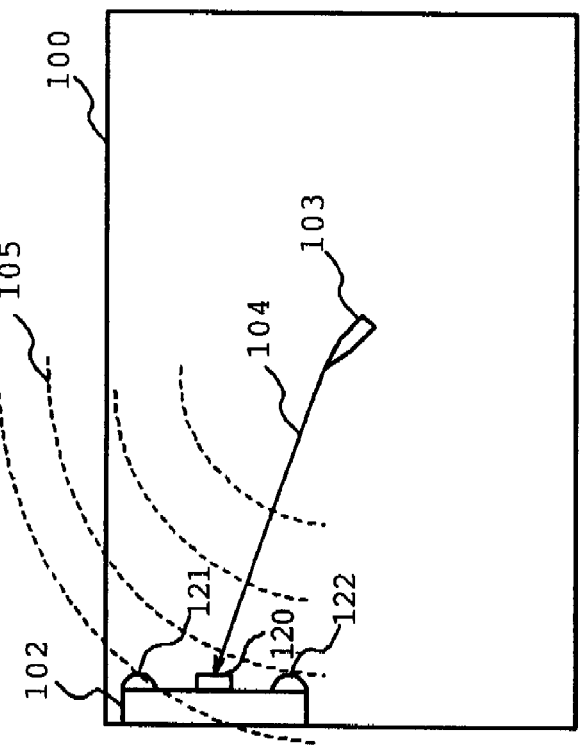
Figure 2:
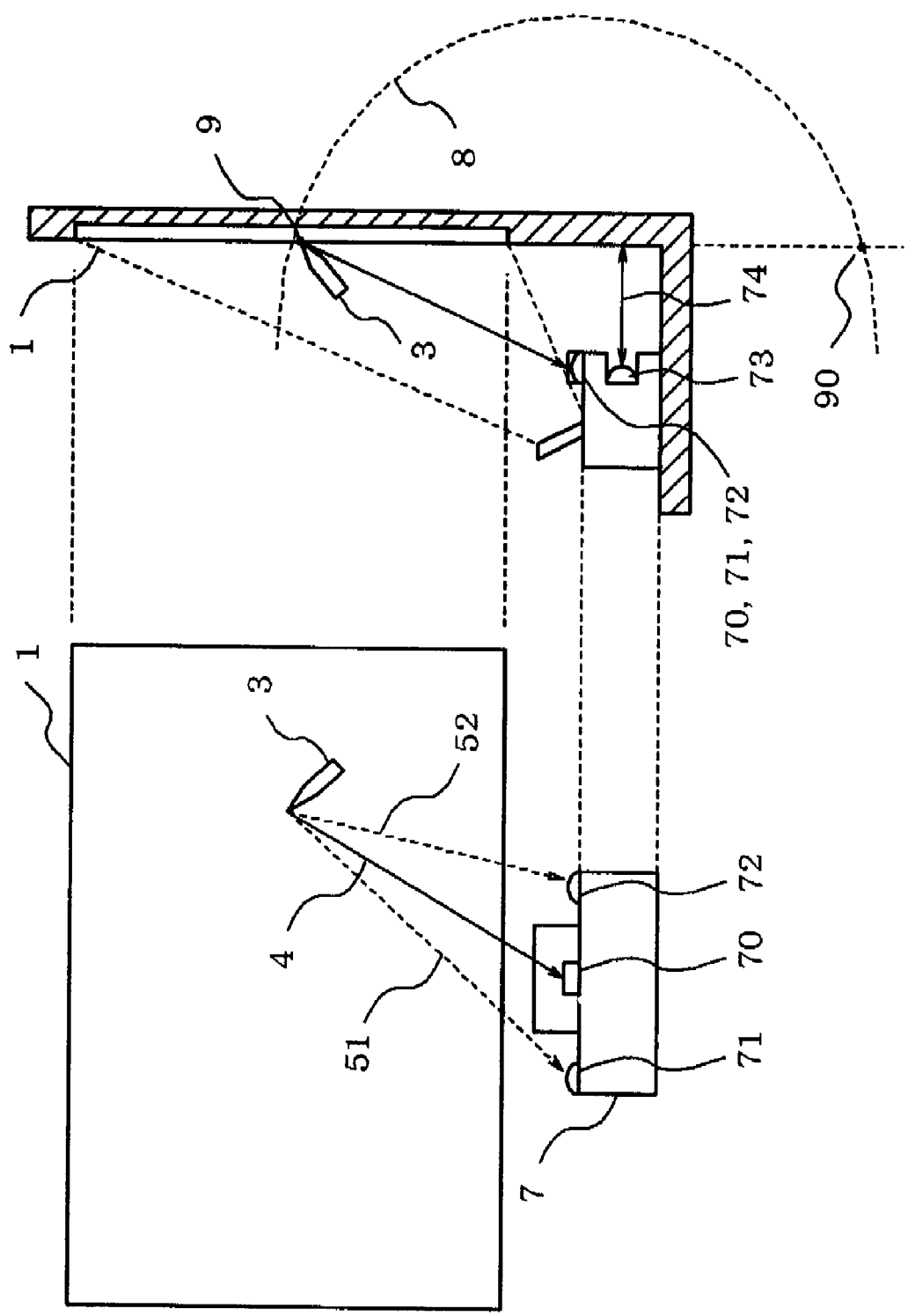
FIG. 2 is a view for explaining a form of utilizing the projection system of the present invention.

FIG. 2 shows an embodiment of the projection system of the present invention. This projection system is composed of screen 1, electronic pen 3 for drawing forms on the screen, and projector 7. Electronic pen 3 has an infrared light emission device and an ultrasonic generator.

Figure 3:
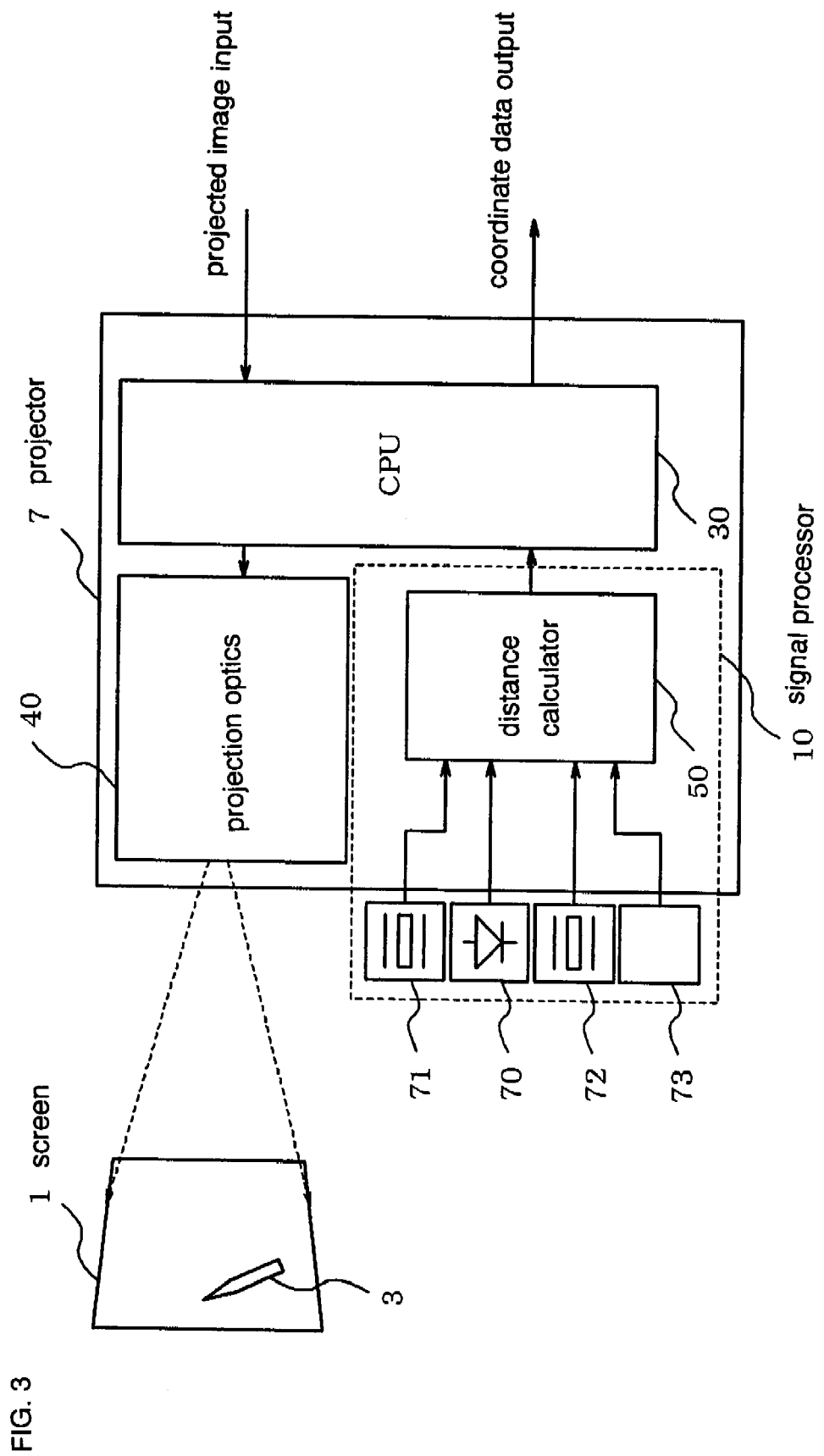
FIG. 3 is a block diagram showing the configuration of the projector of the present invention.

In addition, the compositional blocks of projector 7 are shown in FIG. 3.

Projector 7 is made up from: signal processor 10, projection optics 40, and CPU 30. Signal processor 10 is made up from: infrared photodetector 70, ultrasonic receivers 71 and 72, distance measurement means 73 for measuring the distance to the screen, and distance calculator 50 for calculating the distance to electronic pen 3 based on the outputs of these components.

Projection optics 40 in this case indicates a mirror projection system for projecting a display image on a light valve (not shown in the figure) by means of a plurality of non-spherical mirrors. A projector of this type can realize ultra-short focusing and features the advantages offered by using an electronic blackboard function, i.e., the ability for the person giving a presentation to stand in front of the screen without blocking the projection light, thus eliminating both glare and shadows.

Distance measurement means 73 for measuring the distance to the screen is in this case constituted by an ultrasonic sensor.

The ultrasonic sensor sends ultrasonic pulses into the air by driving a piezoelectric curved vibrator having a oscillation frequency of approximately 40-50 KHz by burst pulses having a fixed cycle, and uses the same vibrator to detect reflected pulse echoes from screen 1.

Distance measurement means 73 for measuring the distance to the screen may be a millimeter-wave echo sounder means.

Sending a continuous millimeter wave toward the screen causes interference with the reflected waves from the screen.

The positions of the interference peaks and troughs vary when the oscillation frequency is swept. The distance between the projector and screen can be detected based on the trace width of the frequency and the interference amplitude.

Distance calculator 50 calculates the three-dimensional coordinate distance between electronic pen 3 on the screen and projector 7 based on distance information to the screen that was measured by distance measurement means 73 as well as the time differences between ultrasonic pulses 51 and 52 that are received by ultrasonic receivers 71 and 72 and infrared light pulse 4 from electronic pen 3 that is photodetected by infrared photodetector 70.

CPU 30 carries out a process for correcting the trapezoidal distortion during projection in the projected image input as necessary and supplies the resulting projected image input as output to the light valve. At the same time, CPU 30 calculates the position of electronic pen 3 based on the output of distance calculator 50 and supplies this result outside the projector.

Explanation next regards the operation of the projector.

Projector 7 projects an input image onto screen 1.

The principles of the operation for acquiring the position of electronic pen 3 are similar to those of the prior-art example in which a signal processor was provided on a screen, but in contrast with the prior-art example, ultrasonic receivers 71 and 72 are not on the screen surface and cannot use the principles of triangulation in a two-dimensional area. In actuality, even if the two distances from electronic pen 3 to ultrasonic receivers 71 and 72 are found by means of ultrasonic wave pulses 51 and 52, the position of electronic pen 3 can be determined only as somewhere on a circle that takes as center a portion of the line that joins the two ultrasonic receivers 71 and 72 and that is perpendicular to the straight line, as can be seen by position 8 of electronic pen 3 as determined by the ultrasonic receivers.

Thus, in order to acquire the position of electronic pen 3 on the screen, the distance from ultrasonic receivers 71 and 72 to the screen must be obtained. Once this distance is found, the position of electronic pen 3 can be limited to intersection 9 between the screen surface and the circle described by position 8 of the electronic pen that was obtained by the ultrasonic receivers. Although there are two points of intersection between the surface and the circle, and electronic pen 3 may also be located at intersection 90, in actuality, only intersection 9 need be considered.

The position of a projected image on the screen is calculated by CPU 30 based on the distance between projector 7 and screen 1. Using this position as a reference, the position of electronic pen 3 is normalized and supplied as coordinate data output. Accordingly, the position of electronic pen 3 can be acquired without the need for projector 7 to project an image onto screen 1.

Figure 4:
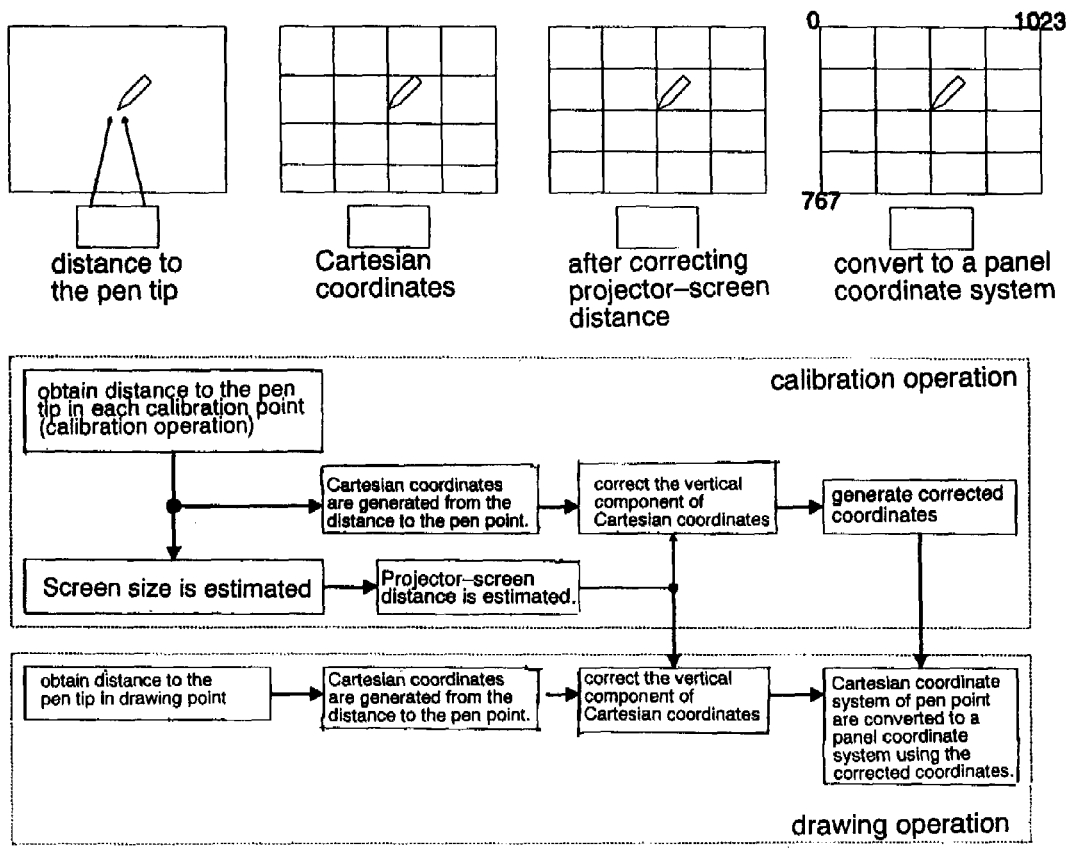
FIG. 4 shows the coordinate conversion process by means of the calibration operation and an actual drawing operation.

Calibration is realized before electronic pen 3 is used. FIG. 4 shows the calibration operation.

In calibration, by using electronic pen 3 to indicate calibration points that are displayed by projector 7, the projector-screen distance is first estimated, following which the projector-screen distance is used as a basis for correcting the vertical component of Cartesian coordinates that are derived by converting the distance to the pen tip. This correction is carried out for each of the calibration points and the generated coordinates are then stored as corrected coordinates.

In actual drawing, Cartesian coordinates are generated from the distance to the pen point, the vertical component is corrected using the projector-screen distance that was obtained in calibration, and the Cartesian coordinates following correction are then converted to a panel coordinate system using the corrected coordinates that were obtained during calibration.

Although a case was described in the present embodiment in which the distance to the screen was obtained by using distance measurement means 73 that assumes that the screen size is variable, the distance to the screen may be directly applied as input to the projector when the projector body is installed in a fixed position.

In addition, a case was described in which signal processor 10 is mounted in projector 7, but as one option, signal processor 10 can be also be furnished as an accessory.

Although the foregoing explanation related to a case in which the projector was a mirror-projection type projector, the present invention is also effective for a projector of the lens-projection type.

While preferred embodiments of the present invention have been described using specific terms, such description is for illustrative purposes only, and it is to be understood that changes and variations may be made without departing from the spirit or scope of the following claims.

What is claimed is:

1. A projector comprising:
a photodetector;
a first sonic receiver and a second sonic receiver;
a distance acquirer; and
a distance calculator coupled to said photodetector, said first sonic receiver, said second sonic receiver, and said distance acquirer,
wherein said photodetector detects light emitted from an object which is on a projected surface,
said first sonic receiver and said second sonic receiver receive a sonic wave emitted from the object,
when the object indicates calibration points displayed on the projected surface and calibration of coordinates is performed, said distance acquirer acquires a distance from said projector to the projected surface using the result of said calibration,
said distance calculator calculates a position of the object based on outputs of said photodetector, said first sonic receiver, said second sonic receiver, and said distance acquirer; and
wherein Cartesian coordinates are generated based on said acquired distance to said object, a vertical component . . . . is corrected using a projector-screen distance that was obtained during said calibration, and the Cartesian coordinates following correction are then converted to a panel coordinate system using the corrected coordinates that were obtained during calibration.

2. The projector according to claim 1, wherein the object comprises an electronic pen.

3. The projector according to claim 1, wherein the projected surface comprises a screen.

4. The projector according to claim 1,
wherein said distance calculator calculates said position based on
a first time difference between the reception of said sonic wave by said first sonic receiver and the detection of said light by said photodetector,
a second time difference between the reception of said sonic wave by said second sonic receiver and the detection of the light by said photodetector, and
the distance to the projected surface.

5. The projector according to claim 1, wherein said photodetector comprises an infrared photodetector, and said light comprises an infrared light.

6. The projector according to claim 1, wherein said light comprises a light pulse.

7. The projector according to claim 1, wherein said first sonic receiver comprises a first ultrasonic receiver, said second sonic receivers comprises a second ultrasonic receiver, and said sonic wave comprises an ultrasonic wave.

8. The projector according to claim 1, wherein said sonic wave comprises a sonic pulse.

9. The projector according to claim 1, wherein said distance acquirer comprises an ultrasonic sensor or a millimeter-wave echo sounder.

10. The projector according to claim 1, further comprising: a mirror projection system.

11. An object position calculation method used in a projector, comprising:
detecting light emitted from an object which is on a projected screen;
receiving a first sonic wave and a second sonic wave emitted from the object;
when the object indicates calibration points displayed on the projected surface and calibration of coordinates is performed, acquiring a distance from the projector to the projected surface using the result of said calibration;

calculating a position of the object based on the detected light, the first sonic wave, the second sonic wave, and the acquired distance; and wherein Cartesian coordinates are generated based on said acquired distance to said object, a vertical component . . . is corrected using a projector-screen distance that was obtained during said calibration, and the Cartesian coordinates following correction are then converted to a panel coordinate system using the corrected coordinates that were obtained during calibration.

12. The method according to claim 11, wherein the object emits a sonic wave, and the first sonic wave and the second sonic wave, which are received, are the sonic wave.

13. The method according to claim 11, wherein the first sonic wave and the second sonic wave are emitted from the object at the same time.

14. The method according to claim 11, further comprising:
displaying a calibration point;
indicating said calibration point using an object; and
calibrating coordinates using a result of said indication of said calibration point.

15. A projector accessory comprising:
a photodetector;
a first sonic receiver and a second sonic receiver;
a distance acquirer; and
a distance calculator coupled to said photodetector, said first sonic receiver, said second sonic receiver, and said distance acquirer,
wherein said photodetector detects light emitted from an object which is on a projected screen,
said first sonic receiver and said second sonic receiver receive a sonic wave emitted from the object,
when the object indicates calibration points displayed on the projected surface and calibration of coordinates is performed, said distance acquirer acquires a distance from the projector accessory to the projected surface using the result of said calibration,
said distance calculator calculates a position of the object based on outputs of said photodetector, said first sonic receiver, said second sonic receiver, and said distance acquirer; and
wherein Cartesian coordinates are generated based on said acquired distance to said object, a vertical component . . . is corrected using a projector-screen distance that was obtained during said calibration, and the Cartesian coordinates following correction are then converted to a panel coordinate system using the corrected coordinates that were obtained during calibration.

16. A projector system comprising:
a projector; and
an electronic pen,
wherein said projector comprises:
a photodetector;
a first sonic receiver and a second sonic receiver;
a distance acquirer; and
a distance calculator coupled to said photodetector, said first sonic receiver, said second sonic receiver, and said distance acquirer,
wherein said photodetector detects light emitted from said electronic pen which is on an projected screen,
said first sonic receiver and said second sonic receiver receive a sonic wave emitted from said electronic pen,
when the object indicates calibration points displayed on the projected surface and calibration of coordinates is performed, said distance acquirer acquires a distance from said projector to the projected surface using the result of said calibration,
said distance calculator calculates a position of said electronic pen based on outputs of said photodetector, said first sonic receiver, said second sonic receiver, and said distance acquirer; and
wherein Cartesian coordinates are generated based on said acquired distance to said from a distance to a pen point . . . , a vertical component is corrected using a projector-screen distance that was obtained during said calibration, and the Cartesian coordinates following correction are then converted to a panel coordinate system using the corrected coordinates that were obtained during calibration.

17. A projector comprising:
photodetection means for detecting light emitted from an object which is on a projected screen;
first sonic receiving means for receiving a sonic wave emitted from the object;
second sonic receiving means for receiving said sonic wave;
distance acquirement means for, when the object indicates calibration points displayed on the projected surface and calibration of coordinates is performed, acquiring a distance from said projector to the projected surface using the result of said calibration;
distance calculation means for calculation a position of the object,
wherein said distance calculation means calculates said position based on outputs of said photodetection means, said first sonic receiving means, said second sonic receiving means, and said distance acquirement means; and
wherein Cartesian coordinates are generated based on said acquired distance to said object, a vertical component . . . is corrected using a projector-screen distance that was obtained during said calibration, and the Cartesian coordinates following correction are then converted to a panel coordinate system using the corrected coordinates that were obtained during calibration.

18. The projector according to claim 1, wherein the distance from the projector to the projected surface is a distance along a line that is perpendicular to the projected surface.

19. The projector according to claim 1, wherein the distance from the projector to the projected surface is a distance from the projector to a portion of the projected surface other than a portion on which an image is projected.

* * * * *

UNITED STATES PATENT AND TRADEMARK OFFICE
CERTIFICATE OF CORRECTION

| | | |
|---|---|---|
| PATENT NO. | : 8,305,344 B2 | Page 1 of 1 |
| APPLICATION NO. | : 11/625631 | |
| DATED | : November 6, 2012 | |
| INVENTOR(S) | : Youichi Tamura | |

It is certified that error appears in the above-identified patent and that said Letters Patent is hereby corrected as shown below:

In the Specification

Column 2, Line 43-44: Delete "projector screen" and insert -- projector-screen --

Column 2, Line 66: Delete "projector screen" and insert -- projector-screen --

Column 3, Line 36-37: Delete "projector screen" and insert -- projector-screen --

In the Claims

Column 6, Line 24-25: In Claim 1, after "component", delete "..."

Column 7, Line 7-8: In Claim 11, after "component", delete "..."

Column 7, Line 46-47: In Claim 15, after "component", delete "..."

Column 8, Line 18-19 (Approx.): In Claim 16, after "said", delete "from a distance to a pen point . . . ," and insert -- object, --

Column 8, Line 45-46: In Claim 17, after "component", delete "..."

Signed and Sealed this
Fourteenth Day of October, 2014

Michelle K. Lee
*Deputy Director of the United States Patent and Trademark Office*